April 9, 1935.  C. WRIGHT  1,997,354
COMBINED CINEMATOGRAPH CAMERA AND PROJECTOR
Filed Oct. 23, 1933  2 Sheets-Sheet 1

C. Wright
INVENTOR

By Marks & Clerk
Attys

April 9, 1935. C. WRIGHT 1,997,354
COMBINED CINEMATOGRAPH CAMERA AND PROJECTOR
Filed Oct. 23, 1933 2 Sheets-Sheet 2
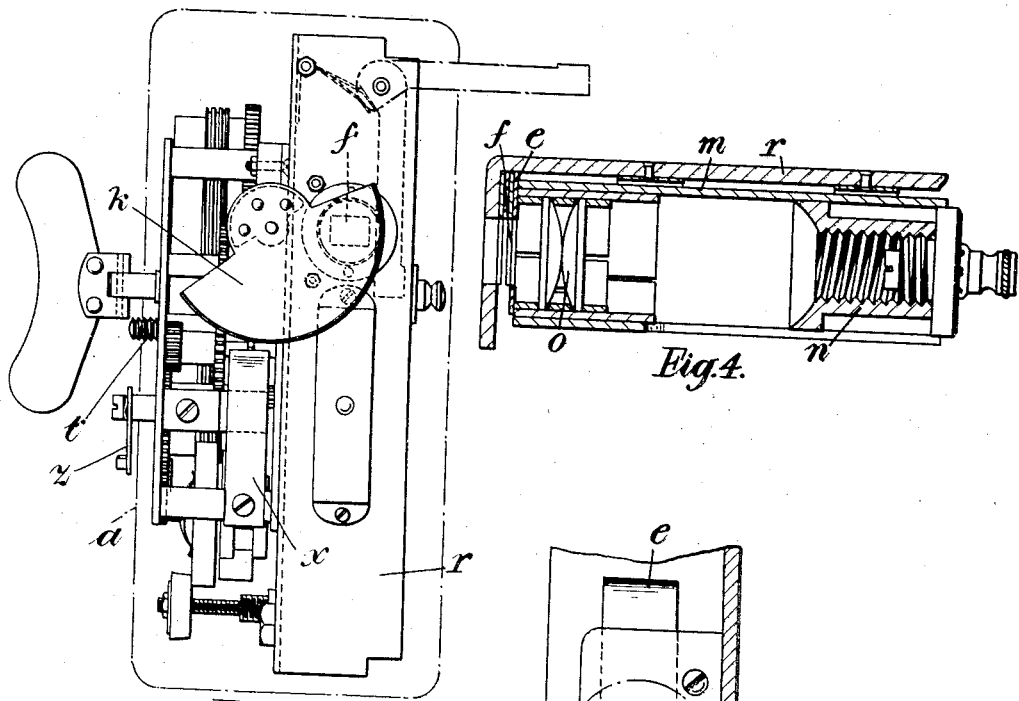

Patented Apr. 9, 1935

1,997,354

UNITED STATES PATENT OFFICE 1,997,354

COMBINED CINEMATOGRAPH CAMERA AND PROJECTOR

Charles Wright, London, England

Application October 23, 1933, Serial No. 694,860
In Great Britain April 5, 1932

4 Claims. (Cl. 88—18.4)

This invention relates to combined cinematograph cameras and projectors of the kind in which the claw member by which the film is moved intermittently in relation to the lens in front of it is disposed behind the film whereby it results that the latter may be arranged in close proximity to the lens with the result that a short focus lens may be employed and thus the apparatus may be utilized for both taking and projecting pictures without the necessity for changing the lens or focus.

The object of the present invention is to devise an improved form of apparatus of the above character in which the film will not be so liable to damage as heretofore, and the invention consists in a combined cinematograph camera and projector of the kind referred to in which the film feeding claw is associated with a locating pin for holding the film stationary during the time that the film feeding claw is disengaged therefrom, the film feeding claw and locating pin being respectively operated by a cam and by a cam or a projection both carried and so located on a rotary disc that when one member is engaged with the film the other is disengaged and vice versa.

The invention also consists in a combined cinematograph camera and projector of the above character in which the film travels in or on a metal guide or track adapted to locate the film in relation to the lens and to impose sufficient frictional resistance to the movement of the film to render unnecessary any auxiliary spring or frictional resistance members to maintain a proper tension on the film.

Further features of the invention will be apparent from the description given hereafter.

The accompanying drawings illustrate one mode of carrying out the invention.

Figure 3 is a front elevation of the mechanism, and

Figures 4, 5 and 6 are views on a somewhat larger scale showing details of the apparatus.

Figure 1:
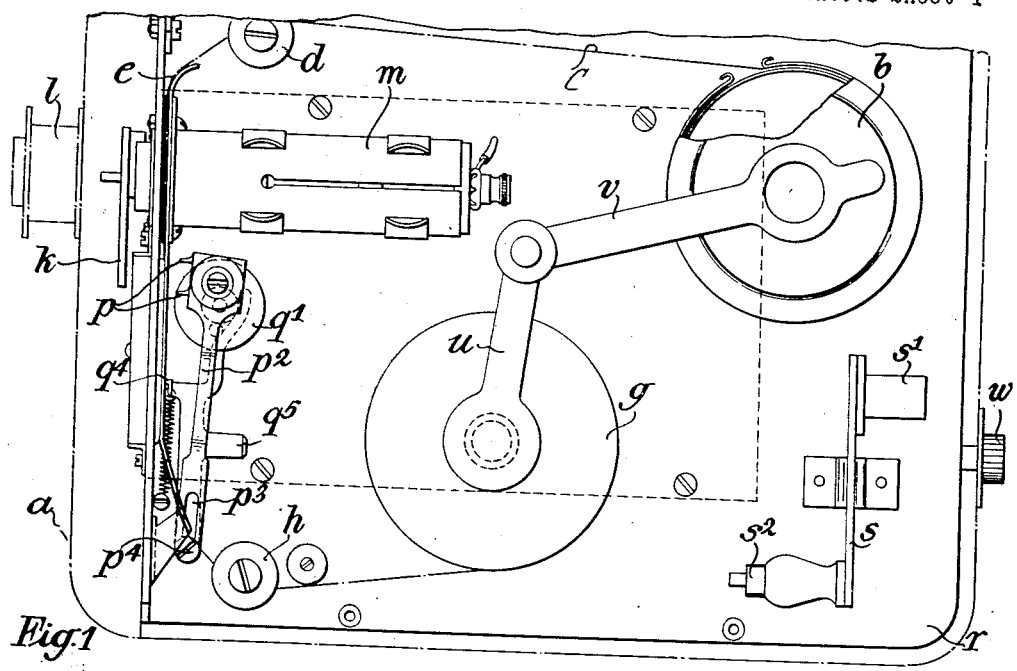
Figure 1 is a side elevation of one form of apparatus in accordance with the invention and showing the film moving mechanism and associated parts.
Figure 2:
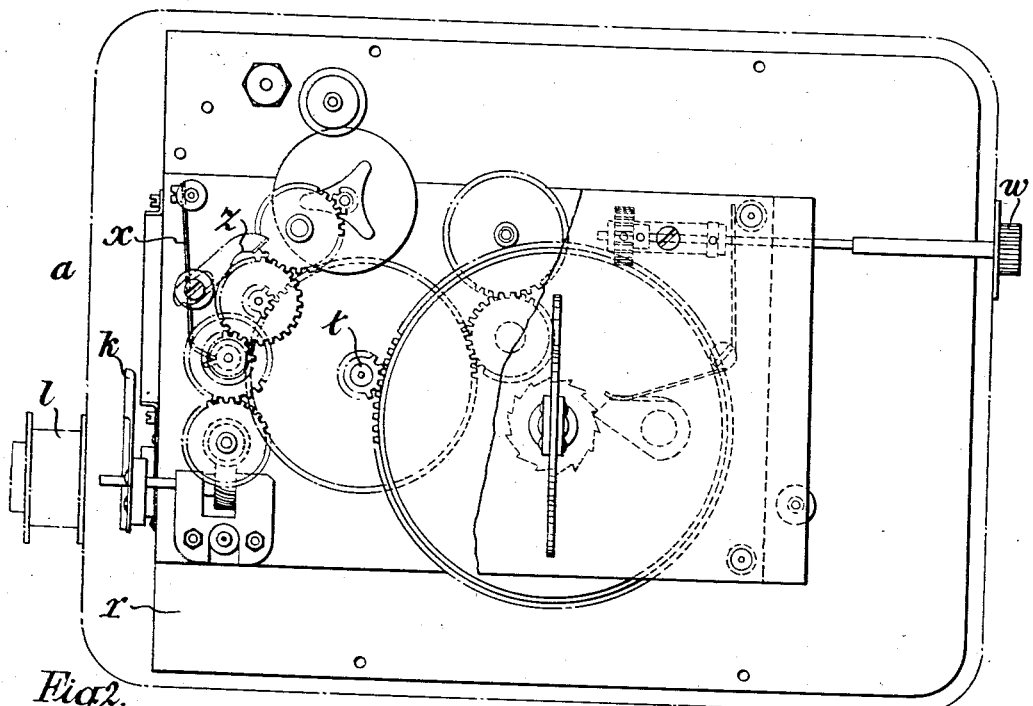
Figure 2 is a reverse view showing the clockwork drive and showing the apparatus inverted in relation to the position shown in Figure 1.

In carrying my invention into effect in one convenient manner I form my improved apparatus with an outer box or casing $a$ (indicated by chain dotted lines in the drawings) of any desired size and shape and from metal or other suitable material.

Within the outer casing and mounted on a plate $r$ therein I provide a box, case or magazine $b$ for the film spool from which the film $c$ passes over an idler pulley or roller $d$ and enters or passes over a metal track or guide $e$ which guides the film past the exposing or projecting aperture $f$ in an end flange $r'$ of the plate $r$ and thence to a suitable take-up spool $g$, a further idler $h$ being provided between the exit end of the guide or track and the take-up spool if necessary.

The film track $e$ is conveniently formed by a resilient metal plate or a channel and while its upper part is confined by a plate $e'$ having an aperture corresponding with the aperture $f$ and with a similar aperture in the film track, the lower part of the guide or track is free and a stop $i$ is provided to limit the movement of the free end. The result of this arrangement is to impose sufficient frictional resistance to the movement of the film to render unnecessary any auxiliary spring or like member to maintain a proper tension on the film. The rotating shutter $k$ is mounted in front of the aperture $f$ and an advantage of the invention is that a smaller cover blade than usual may be employed thereby reducing the periods during which the light passing through the film is cut off to a minimum.

Behind the film and in alignment with the lens $l$ and gate opening $f$ I arrange a removable lamp-housing or tube $m$ adapted to contain a suitable electric lamp (not shown) which may be energized, for example, by means of a dry battery or electric lighting current through a small transformer. The lamp may be mounted in a holder $n$ which may be slidable in the tube which also carries a suitable lens system $o$.

For the purpose of moving the film through the apparatus I provide behind the film a double claw $p$ the two teeth or pins of which are spaced so that they will engage consecutive openings in the film and this claw I operate by means of a mechanism which comprises a cam on a rotary disc and will give a substantially rectangular motion to the claw comprising four movements, namely a forward substantially horizontal movement, a substantially vertical downward movement, a substantially horizontal rearward movement and an upward substantially vertical movement. This motion may be obtained, for example, in known manner by means of a triangular cam $q$ having curved faces and disposed to rotate within a rectangular opening $p'$ in the arm $p^2$ to which the claw is secured or with which the same is integrally formed, the arm $p^2$ having a slot $p^3$ in its lower end, engaging a pin $p^4$ upon the plate $r$ within the casing by which the mechanism is carried so as to permit of the necessary claw movements under the influence of the operating cam. The latter is carried eccentrically upon a rotating disc $q'$ which may be driven by hand or as shown by suitable clockwork and the disc also carries a cam or a projection $q^2$ adapted to engage a spring-controlled arm $q^3$ pivoted to the pin $p^4$ of the plate $r$ and having a film locating pin $q^4$ adapted to enter an aperture in the film. The driving mechanism for the claw and locating pin is so arranged that when the claw engages the film for driving, the locating pin is withdrawn from the film, while when the claw disengages from the film on its rearward movement the locating pin immediately enters the film in order to hold the same stationary until the driving claw again reenters the film perforations.

The locating pin arm $q^3$ may be provided with a finger projection $q^5$ by means of which the pin $q^4$ may be withdrawn from its operative position when a new film is being threaded or when rewinding the film.

When the apparatus is to be driven by hand this may be accomplished by a handle $s$ the end $s'$ of which may be threaded onto the end of the spindle $t$ of the clock-train, and the end $s^2$ of the handle may be adapted for rotating a film spool when this is desired. When not required for use the handle member may be secured in a suitable spring clip as shown in Figure 1.

By means of an apparatus constructed and arranged in the above manner I am able to secure a fast speed for the picture change while the driving and arresting mechanisms for the film may be operated at high and lower speeds without damage to the film or film perforations, while a further advantage of the arrangement consists in the simplicity and ease with which a new film may be inserted.

In some cases it may be necessary or desirable to provide means for holding the projector film spool boxes locked in position and arms $u, v$ may be provided for the purpose and/or the boxes may be furnished with tongues or projections adapted to engage with slots in the part upon which the box is mounted. The arm $u$ (Figure 1) enables the film to be wound direct on to the take-up spindle without the use of magazine or spool box. The arm $v$ is formed with an opening to enable the handle $s$ to rewind films back on to the feed spool without removing the same from the camera.

An indicator $w$ driven from the mechanism may be provided for indicating the length of film run through the machine for exposure or projection. Thus the indicator may be driven through a worm engaging a worm wheel on the clockwork spring drum, the reduction ratio being chosen so as to give the required indication of the length of film run through the machine.

As above indicated the apparatus may be driven by hand, or by a clockwork or other motor, and the gearing is such that the shutter will be operated in proper synchronism with the movement of the film, while the take-up spool will also be driven at a variable rate corresponding to the film movement, being driven from the clockwork by any suitable form of friction drive.

The clockwork drive may be set into or out of action by a spring detent $x$ operated by a lever $z$ or by other suitable means.

It will be understood that the foregoing details of construction have been given purely by way of illustration and not of limitation and the same may be varied according to whether the apparatus is to be of an expensive or inexpensive character or upon any practical requirements that may have to be fulfilled.

Having now described my invention, what I claim as new and desire to secure by Letters Patent is:—

1. In a combined cinematograph camera and projector, a film feeding claw member, a locating pin member, pivoted arms supporting said members and extending longitudinally of the film path, a pivot common to both said arms, a rotary disc, a cam operating said claw member and eccentrically mounted on said disc, and a projection on said disc operating said locating pin member and angularly displaced with respect to said cam whereby the locating pin is caused to oscillate about said pivot to engage the film when the claw member is disengaged therefrom and vice versa.

2. A cinematograph camera and projector as claimed in claim 1 characterized in that the portions of said members coacting with the cam and the projection are spaced apart and disposed on opposite sides of the rotatable disc.

3. A cinematograph camera and projector as claimed in claim 1 characterized in that said pin member is movable to inoperative position independently of said claw member, a handle-like member connected with said pin member for actuating and moving the latter to inoperative position, and spring means normally tending to move the pin member into engagement with the film.

4. A cinematograph camera and projector as claimed in claim 1 characterized in that the pivoted ends of said arms are disposed side by side in close relation and the opposite ends thereof are spaced apart and receive said discs therebetween.

CHAS. WRIGHT.